US005485536A

United States Patent [19]

Islam

[11] Patent Number: 5,485,536
[45] Date of Patent: Jan. 16, 1996

[54] FIBER OPTIC PROBE FOR NEAR FIELD OPTICAL MICROSCOPY

[75] Inventor: Mohammed N. Islam, Ann Arbor, Mich.

[73] Assignee: AccuPhotonics, Inc., Ann Arbor, Mich.

[21] Appl. No.: 322,210

[22] Filed: Oct. 13, 1994

[51] Int. Cl.$^6$ .............................. G02B 6/26; G02B 21/00; G01N 23/00
[52] U.S. Cl. ................................. 385/31; 385/12; 385/15; 385/39; 385/43; 385/123; 385/127; 385/128; 385/901; 250/306; 250/311; 359/368
[58] Field of Search .................................. 385/15, 12, 27, 385/28, 31, 32, 33, 38, 39, 43, 49, 123, 128, 127, 133, 147, 901, 902; 606/16, 3; 250/306, 311; 359/368

[56] References Cited

U.S. PATENT DOCUMENTS

| | | | |
|---|---|---|---|
| 4,604,520 | 8/1986 | Pohl | 250/216 |
| 4,725,727 | 2/1988 | Harder et al. | 250/227 |
| 4,917,462 | 4/1990 | Lewis et al. | 350/319 |
| 5,018,865 | 5/1991 | Ferrell et al. | 356/376 |
| 5,105,305 | 4/1992 | Betzig et al. | 359/368 |
| 5,138,159 | 8/1992 | Takase et al. | 250/306 |
| 5,168,538 | 12/1992 | Gillespie | 385/123 |
| 5,254,854 | 10/1993 | Betzig et al. | 250/234 |
| 5,272,330 | 12/1993 | Betzig et al. | 250/216 |
| 5,286,970 | 2/1994 | Betzig et al. | 250/227.26 |
| 5,286,971 | 2/1994 | Betzig et al. | 250/227.26 |
| 5,288,996 | 2/1994 | Betzig et al. | 250/227.26 |
| 5,288,997 | 2/1994 | Betzig et al. | 250/227.26 |
| 5,288,998 | 2/1994 | Betzig et al. | 250/227.26 |
| 5,288,999 | 2/1994 | Betzig et al. | 250/227.26 |
| 5,361,314 | 11/1994 | Kopelman et al. | 385/12 |
| 5,394,500 | 2/1995 | Marchman | 385/123 |
| 5,395,741 | 3/1995 | Marchman | 430/320 |

OTHER PUBLICATIONS

Reddick, R. C. et al. "New Form of Scanning Optical Microscopy," The Americal Physical Society, vol. 39, No. 1, Jan. 1, 1989, pp. 767–770.

Copcoran, Elizabeth, "A Thin Line" Scientific American, Aug. 1990, pp. 98, 100.

Reddick, R. C. et al. "Photon Scanning Tunneling Microscopy," Rev. Sci. Instrum., vol. 61, No. 12, Dec. 1990, pp. 3669–3677.

Ferrell, T. L. et al. "Progress in Photon Scanning Tunneling Microscopy (PSTM)," *Ultramicroscopy*, Aug. 12, 1991, pp. 408–415.

Pangaribuan, T. et al., "Reproducible Fabrication Technique of Nanometric Tip Diameter Fiber Probe for Photon Scanning Tunneling Microscope," Jpn. J. Appl. Phys., vol. 31, Part 2, No. 9A, Sep. 1, 1992. pp. L1302–L1304.

Corcoran, Elizabeth, "Storage Space," *Scientific American*, Oct. 1992, pp. 110, 112.

Markoff, John, "I.B.M. Disk Crammed With Data", *The New York Times*, Jun. 2, 1993.

Van Labeke, D. et al. "Probes for Scanning Tunneling Optical Microscopy: a Theoretical Comparison," J. Opt. Soc. Am. A., vol. 10, No. 10, Oct. 1993, pp. 2193–2201.

Bylinsky, Gene, "Genetics The Money Rush Is On," *Fortune*, May 30, 1994, pp. 94–108.

Pangaribuan, T., et al., "Highly Controllable Fabrication of Fiber Probe for Photon Scanning Tunneling Microscope," Scanning, vol. 16, pp. 362–367 (1994). (no month).

*Primary Examiner*—Brian Healy
*Attorney, Agent, or Firm*—Harness, Dickey & Pierce

[57] ABSTRACT

The near field optical microscopy probe has a conically tapered tip formed from the inner core of a fiber optic cable. The tapered tip protrudes longitudinally from the outer cladding and has a metallized optically opaque coating over all the tip except for the light-emitting aperture at the tip apex. The optical probe is manufactured by wet chemical etching. The protruding conical tip tapers at an acute angle on the order of about 15° to 35°, such that the tip length is on the order of a few wavelengths. By this construction, illumination traverses only a very small nonpropagating mode or evanescent mode region with resulting high optical efficiency. The probe and specimen may be supercooled, causing the metallized coating to be highly conductive and therefore optically opaque. The result is a high efficiency, high resolution probe suitable for such demanding applications as DNA sequencing.

29 Claims, 4 Drawing Sheets

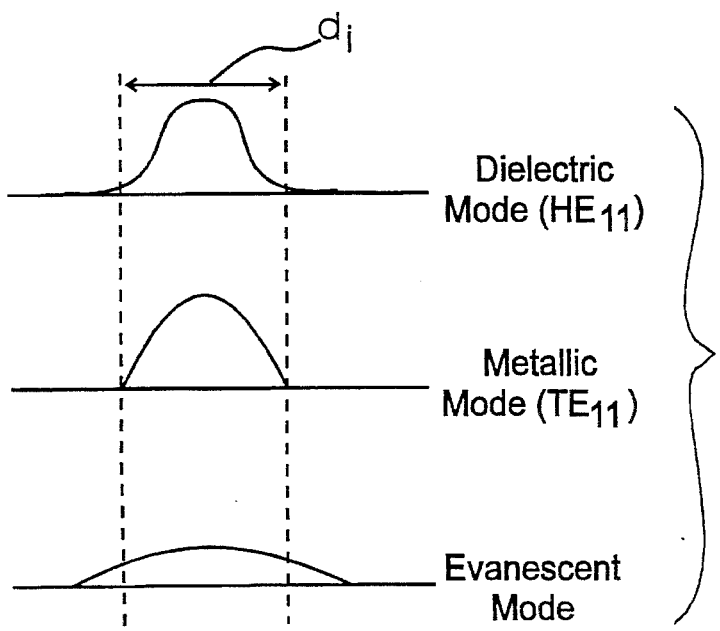
Figure 2
Prior Art
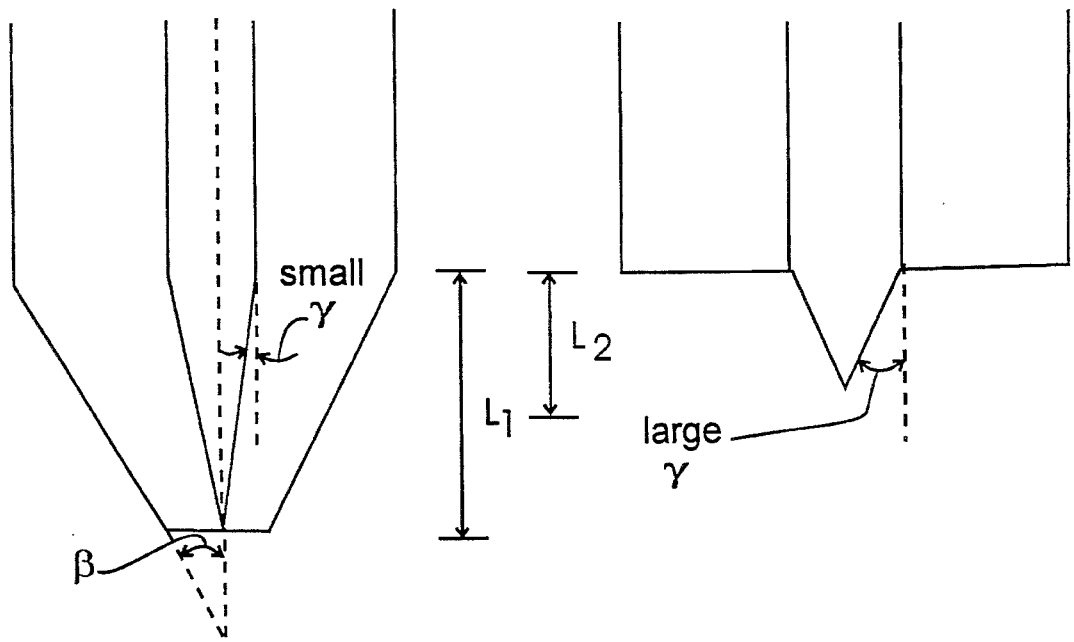
Figure 3
Figure 4

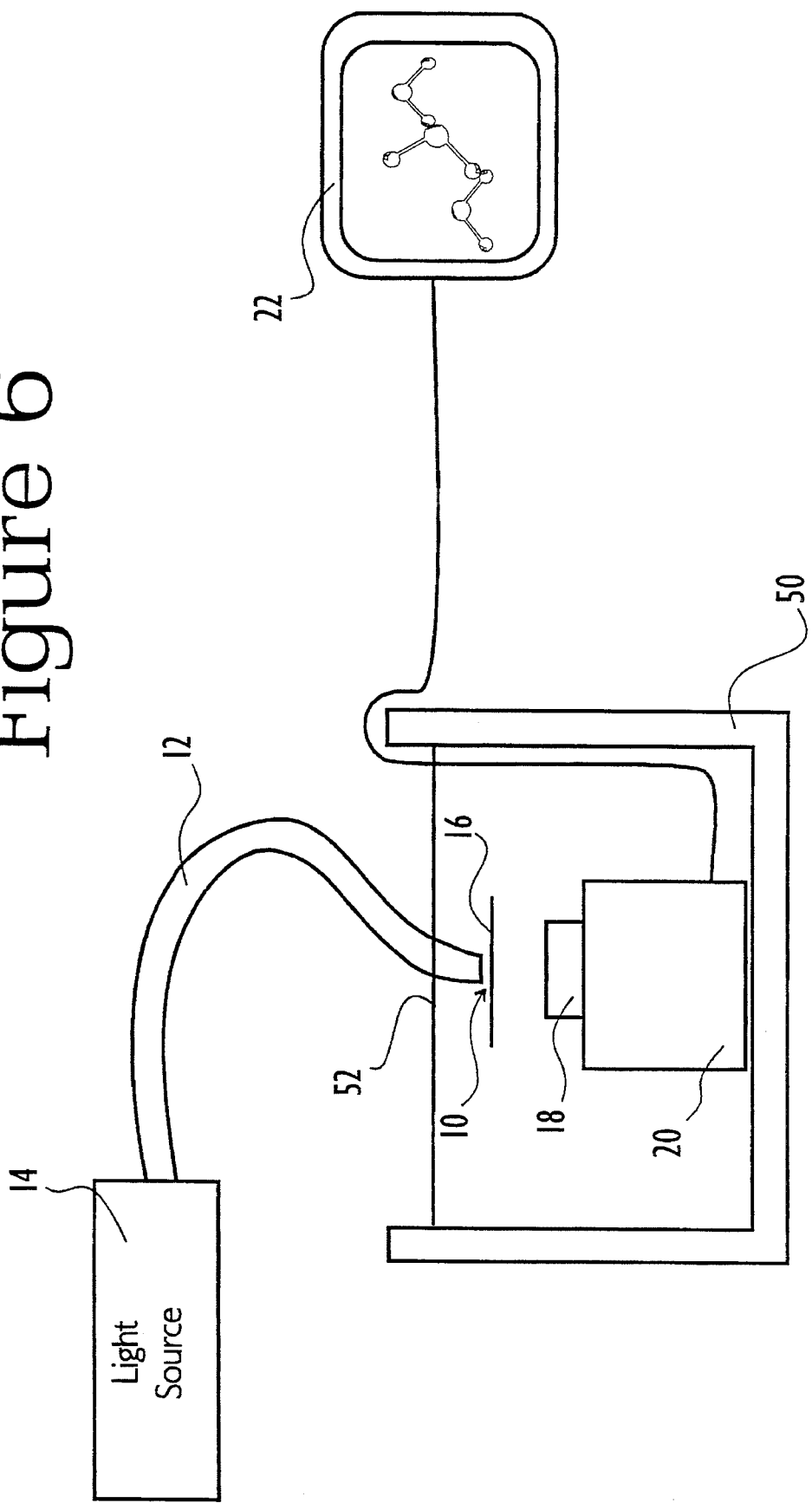

FIBER OPTIC PROBE FOR NEAR FIELD OPTICAL MICROSCOPY

BACKGROUND AND SUMMARY OF THE INVENTION

The present invention relates generally to near field optical microscopy (NSOM). More particularly, the invention relates to an improved fiber optic probe which provides dramatically improved efficiency and resolution.

The conventional compound microscope, now ubiquitous in the research laboratory, relies on illuminating the specimen by an external light source and using lenses in the far field to gather and focus the light, The far field corresponds to a specimen-lense distance of many optical wavelengths. There is, however, a limit to the resolving power of the conventional compound microscope. A physical phenomenon known as the diffraction limit prevents far field optical systems from resolving images smaller than roughly one-half the optical wavelength.

In 1928 Synge suggested that optical microscopy could overcome the diffraction limit of light by abandoning the far field and instead working in the near field. The near field exists in close proximity to the specimen, less than one optical wavelength. Using a tiny aperture and placing that aperture in the near field of the specimen, optical microscopy can achieve significantly greater resolving power. According to Synge's suggestion, the specimen is placed in the near field of the aperture, and light is delivered through the aperture so that it impinges upon and is reflected from or transmitted through the specimen. The reflected or transmitted light is then collected and viewed with a conventional optical microscope. In this way, only a tiny portion of the specimen is illuminated, hence all of the light entering the optical microscope corresponds to a single microscopic feature. This technique is thus capable of producing higher resolution than conventional optical microscopes.

A number of different implementations of Synge's idea have been experimented with. Pohl suggested that optical implementations could be achieved by coating the tip of a prism-like crystal. The first successful optical near field demonstration was by a group at Cornell which "taffy-pulled" glass micropipettes down to sub-wavelength diameters and defined the aperture by metallic overcoats. The taffy-pulled micropipette was highly inefficient, because the sub-wavelength diameter of the pipette choked off virtually all of the light, so that very little light would exit through the aperture to impinge upon the specimen.

Betzig and coworkers at AT&T Bell labs improved upon the Cornell taffy-pulled micropipette by replacing the glass micropipette with a fiber optic cable. Using the fiber optic cable Betzig and coworkers increased efficiency by three or four orders of magnitude. The Betzig device is manufactured by heating the fiber optic cable and then taffy-pulling it to sub-wavelength diameter, followed by a metallic overcoat.

While the Betzig device improves efficiency, a fundamental problem still remains. Although light will propagate efficiently down a fiber optic cable of standard diameter, the light becomes choked off when the diameter is reduced beyond a certain dimension. This is because light propagates in a waveguide-like fashion in the fiber optic cable of standard diameter. Specifically, light is confined to the inner core of the fiber optic cable by total internal reflection at the inner core-outer cladding boundary. When confined to the inner core in this fashion, light is said to be in the propagating mode.

However, when the diameter of the inner core is reduced, the propagating mode gives way to an evanescent mode. In the evanescent mode the optical energy is no longer truly propagating and is no longer confined to the fiber optic core, but rather a portion of the energy dissipates or escapes. The longer distance light must travel in this evanescent mode, the more energy that escapes.

It is a physical consequence of the taffy-pulling technique that the stretched fiber optic cable gets to be quite long before the diameter of the inner core becomes reduced sufficiently to form the aperture. Thus when a fiber optic cable is taffy-pulled to an extremely small aperture, the evanescent mode region is very long and efficiency is very poor. For example, a near field optical microscope (NSOM) with a resolution of 1000 Å has an efficiency of roughly $2\times10^{-4}$; by comparison, a NSOM with a resolution of 250 Å has an efficiency of roughly $1\times 10^{-6}$. The resolution plummets even further for smaller resolutions.

This degradation in resolution has significant consequences. Although extremely small apertures can be produced by taffy-pulling, the resulting efficiency is so low that virtually no usable light reaches the aperture and the specimen is not illuminated brightly enough to obtain a useful image.

The present invention overcomes the efficiency degradation problem by providing a light-emitting probe which has a rapidly tapered tip that protrudes longitudinally outwardly from the outer cladding of the fiber optic cable. The tapered tip comprises a portion of the inner core of the fiber optic cable. By extending the inner core longitudinally outwardly from the outer cladding, a very rapid taper can be fabricated by wet chemical etching. Because the inner core is rapidly tapered, light propagating along the inner core spends very little time in the evanescent mode before reaching the aperture. Therefore substantially more optical energy is delivered through the aperture to impinge upon the specimen.

Although other angular tapers may exhibit benefits of the invention, the presently preferred tip tapers at an acute angle on the order of about 15° to 35°.

There are numerous applications where the high efficiency optical probe of the invention will be invaluable. These include, materials characterization, super high density magneto-optical memory and optical lithography. In addition, with the enhancement described next below, the high efficiency optical probe can be modified to yield extremely high resolutions never before attained. With this high resolution enhancement, rapid optical DNA sequencing is made possible. It is expected that optical DNA sequencing will provide a thousand-fold decrease in sequencing time, as compared to conventional electrophoresis techniques.

The high efficiency optical probe is enhanced by applying a metallic overcoat to the tapered tip and then supercooling (e.g. using liquid helium or liquid nitrogen). The supercooled metallic overcoat is thus rendered highly conductive and able to confine the optical energy to a very small aperture. To prevent thermal creep the specimen may also be supercooled in this fashion.

For a more complete understanding of the invention in both the high efficiency and enhanced high efficiency, high resolution forms, reference may be had to the following specification and to the accompanying drawings.

BRIEF DESCRIPTION OF THE DRAWINGS

FIG. 2 is a series of graphs depicting the E-field intensity of the optical illumination in the dielectric mode region, the metallic mode region and the evanescent mode region of the probe of FIG. 1;

FIG. 3 is a cross-sectional view of a prior art probe manufactured using the taffy-pulled technique (not drawn to scale— taper occurs over hundreds of microns while the inner core of the fiber before taper is typically under 10 microns);

FIG. 4 is a cross-sectional view of the probe of the invention arranged next to FIG. 3 for comparison purposes;

FIG. 6 illustrates one embodiment of the optical probe which includes a supercooling arrangement for producing extremely high resolution.

DETAILED DESCRIPTION OF THE PREFERRED EMBODIMENT

Figure 1:
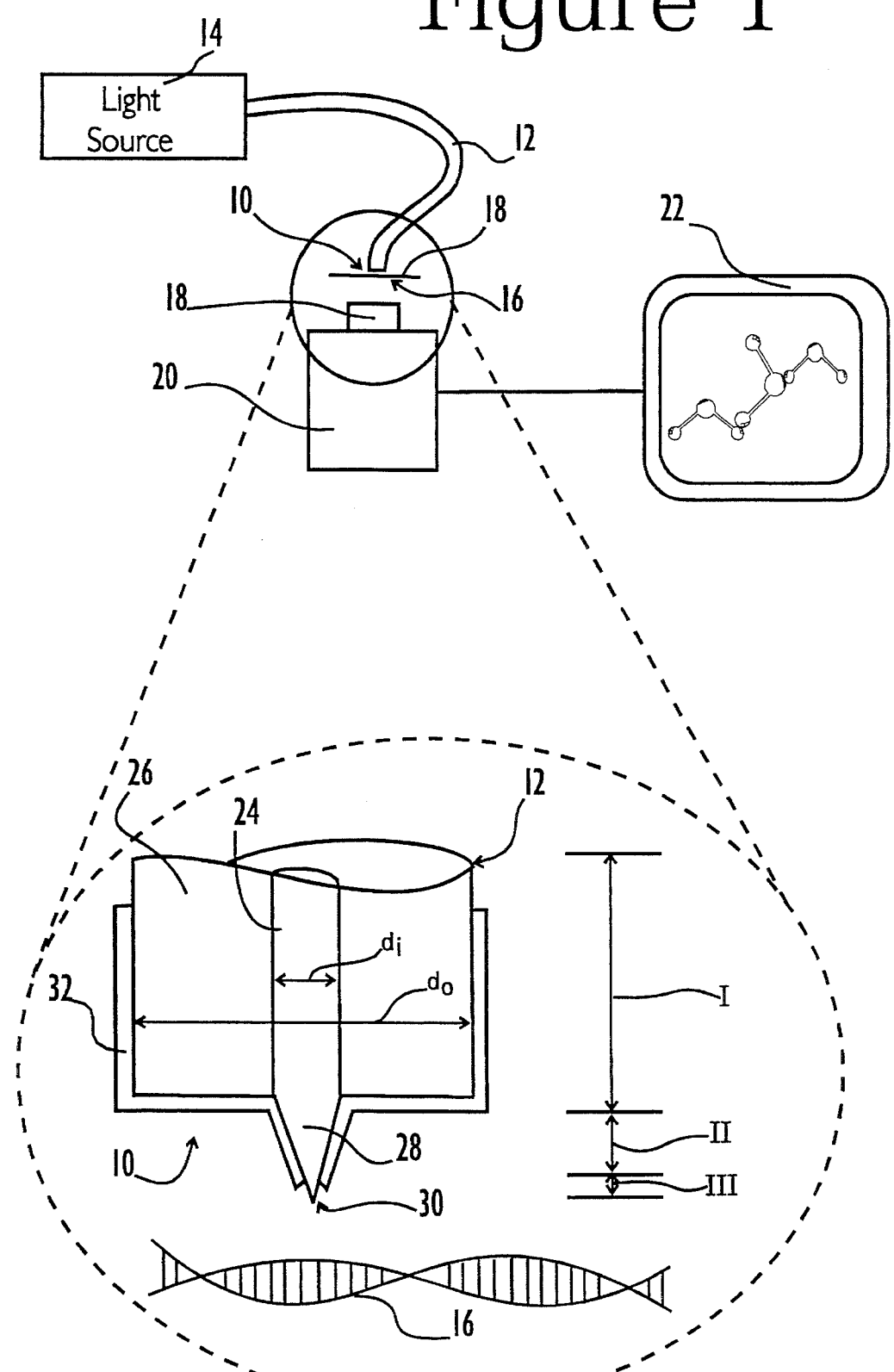
FIG. 1 is a diagrammatic illustration of the optical probe of the invention, including a detailed enlargement of the probe tip to show the details thereof.

Referring to FIG. 1, the high efficiency optical probe is illustrated in a near field optical microscopy application. The optical probe 10 is formed at the distal end of a fiber optic cable 12 which is in turn coupled at its proximal end to a light source 14. The optical probe is a light-emitting probe which projects a highly concentrated, extremely focused near field illumination onto a specimen 16, which may be mechanically positioned on a suitable carrier 18. Illumination from the probe is projected onto the specimen and thereupon collected by a suitable objective 18 positioned to collect either light reflected from the specimen or light transmitted through the specimen. The objective 18 may be a lens coupled to a photomultiplier 20, which may in turn be electronically connected to a monitor 22.

The fiber optic cable has an inner core 24 and an outer cladding 26 that concentrically encapsulates the inner core. The respective diameters of the inner core and outer cladding are such that light propagates in a guided dielectric mode along the length of the fiber optic cable 12. Referring to the enlarged view of the distal end of cable 12 (FIG. 1) the diameter of the outer cladding $d_o$ and the diameter of the inner core $d_i$ are shown.

The light-emitting probe has a tapered tip 28 that protrudes longitudinally outwardly from the outer cladding and that comprises a portion of the inner core 24. The tapered tip 28 defines a light-emitting aperture 30 at its tapered extremity. As will be more fully explained below, the tip 28 is tapered at an acute angle with respect to the longitudinal axis of the cable. An optically opaque coating 32 is applied to the tapered tip, and if desired, also to the outer cladding 26 at the distal end of cable 12. The opaque coating is not present at light-emitting aperture 30.

In the portion of the light-emitting probe where the outer cladding is fully present (region I) illumination from light source 14 propagates in a dielectric mode. In that portion of the probe where the tapered tip protrudes longitudinally outwardly from the outer cladding the mode of propagation changes. In region II the illumination propagates in a metallic mode, which gradually breaks down in region III into an evanescent mode.

FIG. 2 illustrates these different modes of propagation. In FIG. 2 the diameter $d_i$ of the inner core (before taper) has been depicted by dashed lines. FIG. 2 illustrates the E-field intensity of the optical energy. In the dielectric mode, propagation conforms to the $HE_{11}$ mode. In the metallic mode propagation conforms to the $TE_{11}$ mode. The energy makes a transition from the $HE_{11}$ mode to the $TE_{11}$ mode quite efficiently because the field pattern overlay between the two modes is quite good, as illustrated in FIG. 2.

The probe design of the present invention seeks to minimize the distance over which light travels through the evanescent mode region. The efficiency of the probe is dramatically improved by eliminating the nonguiding dielectric mode region, which typically spans more than a hundred wavelengths in a probe of conventional taffy-pulled construction. This may be better understood by referring to FIGS. 3 and 4.

In FIG. 3, a conventional taffy-pulled probe is illustrated. In FIG. 4 the probe of the present invention is illustrated. In FIG. 3 angle β defines the half angle of the cladding taper cone. γ defines the half angle of the core taper cone. In FIG. 4 γ, the half angle of the core taper cone is illustrated. Because the cladding is removed at the probe tip of the invention, no β angle has been illustrated. (If illustrated, β would be essentially 90° in FIG. 4).

With regard to the angle of core taper, the conventional taffy-pulled probe has a comparatively small γ angle of taper, whereas the invention of FIG. 4 has a comparatively large γ angle of taper. In comparing the respective angles of taper in FIGS. 3 and 4, it must be kept in mind that the important consideration is the γ angle of taper of the inner core. One should not, for example, compare the γ angle of FIG. 4 with the β angle of FIG. 3, as this would be a meaningless comparison between the inner core of one with the outer cladding of the other. In the taffy-pulled conventional probe of FIG. 3 there is the following relationship between the angle γ and the angle $$\beta: \tan(\gamma) = \frac{d_i}{d_o} \times \tan(\beta),$$

where $d_i$ is the core diameter and $d_o$ is the cladding diameter. For β less than about 20° and for $d_i$=3 μm and $d_o$=125 μm then γ is less than 1°. Even if β is increased to 35°, γ still works out to be less than 1°. With a γ angle on this 1° order of magnitude, the length of the taffy-pulled probe $L_1$ is quite long (many optical wavelengths). In contrast, because the γ angle of the invention is quite large (e.g., 20° or more) the probe length $L_2$ is quite short (e.g. fewer than 5 optical wavelengths). Thus, whereas the conventional taffy-pulled probe has an elongated adiabatic taper (i.e., a taper over many optical wavelengths), the probe of the invention avoids an elongated adiabatic taper. This means that light propagating down the fiber spends very little time traversing the lossy adiabatic region. It is in this lossy adiabatic region that much of the optical energy is lost in the conventional taffy-pulled probe. The probe of the invention achieves the desired light-emitting aperture size with a significantly shorter probe length, thereby allowing the probe to deliver optical energy at between two to three orders of magnitude brighter than conventional probes. To appreciate the significance of this, consider that in photographic terms, one order of magnitude yields improved sensitivity of between 3 to 4 f-stops and two orders of magnitude yields improved sensitivity of between 6 to 7 f-stops.

Manufacturing the High Efficiency Probe

Figure 5A:
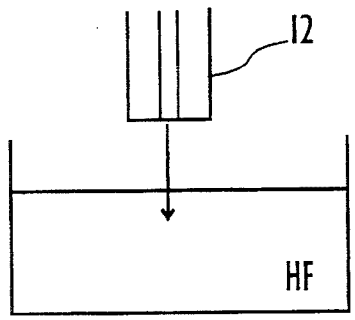
FIGS. 5A–5H (collectively FIG. 5) are a series of diagrammatic views illustrating the method of manufacturing the probe.
Figure 5B:
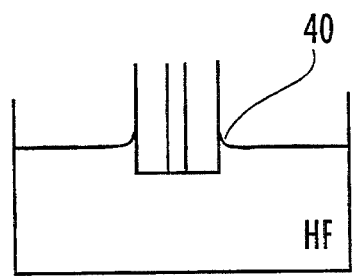

To produce a tapered tip with a γ angle on the order of about 15° to 35°, a wet chemical etching technique may be used. The wet chemical etching technique is illustrated in the series of FIGS. 5A–5H. In FIG. 5A the distal end of fiber optic cable 12 is dipped into an etching solution of buffered hydrofluoric acid (HF). This is illustrated in FIG. 5B. The liquid hydrofluoric acid at the intersection of the air and specimen rises slightly due to surface energetics to form a meniscus 40. The most rapid removal of material occurs in the region just below the meniscus.

Figure 5C:
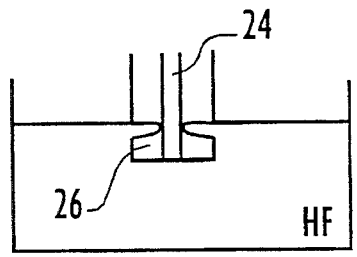
Figure 5D:
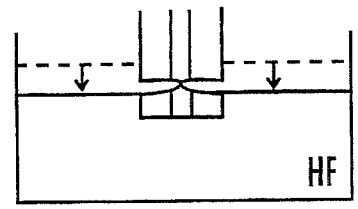

Thus as depicted in FIG. 5C, the outer cladding 26 is etched away leaving the inner core 24 exposed. Then, as illustrated in FIG. 5D, the hydrofluoric etching solution is partially evaporated away at a controlled rate, so that the inner core 24 is etched to defined the acute angle of the tapered tip. In FIG. 5D the dotted line shows the original level of hydrofluoric acid before controlled evaporation.

Figure 5E:
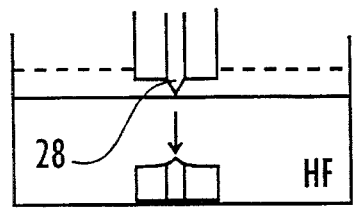
Figure 5F:
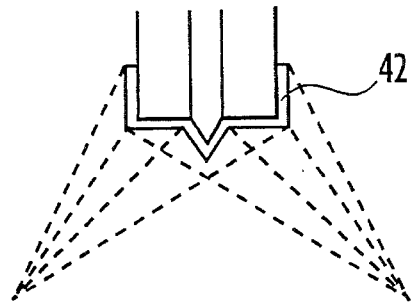
Figure 5G:
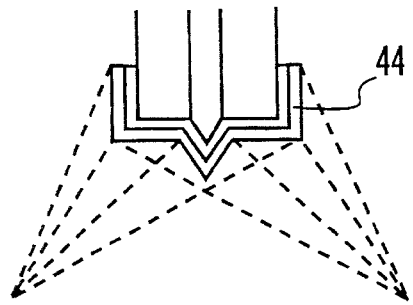
Figure 5H:
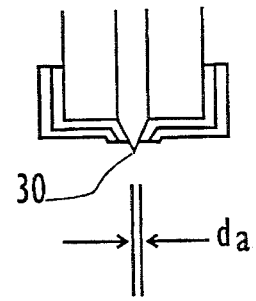

In FIG. 5E the hydrofluoric acid level is finally evaporated below the tapered extremity of the tip 28. Note that a portion of the fiber optic cable removed during etching may separate and fall to the bottom of the etching tank under its own weight. Next, the probe tip is removed from the etching solution, washed of any residual etching solution and then provided with a metallic overcoat. Any suitable optically opaque coating may be used for this purpose. The presently preferred embodiment uses an aluminum overcoating. To improve the adhesion of the aluminum to the fiber optic material, a very thin layer of nickel may be applied as illustrated in FIG. 5F, where the nickel layer is depicted at 42. The metallic layer can be deposited by filament evaporation, by ion beam (sputtering), by electron beam evaporation or by chemical deposition. Thereafter, as illustrated in FIG. 5G the aluminum overcoating layer 44 is applied. Preferably the optically opaque coating is a metal with high conductivity at low temperatures. The aluminum or other metallic layer can be added using a process similar to that used to apply the metallic layer in FIG. 5F. Thus, in the alternative, platinum may be used in place of aluminum. Finally, in FIG. 5H, the metal overcoating is removed from the tapered extremity to form the light-emitting aperture 30. The light-emitting aperture 30 has a diameter $d_a$ which, in some applications, may be on the order of 10 Å. This aperture may be formed by masking during metal evaporation, or by electrochemical etching to remove the metal at the tip (e.g. the tip end can be burned or "blown" off by applying a large voltage). Alternatively, angle deposition may be used towards the end with the tip masked off. To clean the light-emitting aperture or to make fine adjustments in its size, a low current electrochemical etching may be employed.

Supercooling Tip for Improved Resolution

Referring back to FIG. 1, in region II the electromagnetic field of the illumination is largely captured (metallic mode propagation) by the optically opaque cladding. However, for apertures smaller than about 200 Å, leakage of the electromagnetic field into the cladding starts to play a significant role, limiting the ultimate resolution at room temperature to about 120 Å. At room temperature, the electromagnetic field skin depth for visible light is about 65 Å in aluminum. Thus at room temperatures the aluminum metallic coating is no longer fully opaque. To overcome the skin depth limitations, the tip can be supercooled to enhance conductivity of the metal overcoat and to reduce the Johnson noise. Preferably the specimen under examination and the probe tip should be held at the same temperature to avoid thermal drift. With the conductivity enhanced by supercooling, the raw resolution of our fiber optic probe can be on the order to 10 Å, limited by the opacity of a few atomic layers in the metallic coating (i.e. where the bulk approximation begins to break down). Although aluminum is currently used for the overcoat, silver, gold or platinum may be more appropriate at lower temperatures because the conductivity of these materials increased faster with decreasing temperature. The optimum overcoat material choice depends on the conductivity as well as the adherence of the material to the fiber optic cable when cooled.

Referring to FIG. 6, a high resolution, high efficiency optical probe embodiment is illustrated. The optical probe 10 of the invention, as well as the specimen 16 are placed in an insulated cryogenic crucible 50 which may be filled with liquid nitrogen or liquid helium 52. The fiber optic cable 12 associated with probe 10 is connected to light source 14 as described above. Depending on the physical positioning requirements of the light gathering optics, the objective 18 and photomultiplier 20 may also be disposed within crucible 50. Photomultiplier 20 is coupled to the monitor 22 as described above. For more information regarding the technology involved in total immersion of the specimen in liquid nitrogen see J. Mou, J. Yang and Z. Shao, *Review of Scientific Instruments,* June 1993, Vol. 64, p. 1483. In the alternative, a cryostat microscope system can be used to maintain the specimen and probe at supercooled temperatures. A suitable system is available from Oxford Instruments, Concord, Mass., e.g. , Ultra-High Vacuum CryoSTM System. For additional information regarding cryostat systems see R. G. Grober, T. G. Harris, J. K. Trautman, E. Betzig, W. Wegscheider, L. Pfeifer and K. West, *Applied Physics Letters,* Mar. 14, 1994, Vol. 64, p. 1421.

Some Possible Applications

The high efficiency optical probe of the invention is useful in a number of applications. One application is optical memory based on near field magneto-optics. Magneto-optical memory has the advantage of being nonvolatile, making this memory ideal for mobile applications, such as avionics and shipboard applications. Magneto-optical memory is also ideal for automation and process control systems which may be subject to periodic power outages.

Conventional magneto-optic devices exhibit an undesirably slow access time due to the low efficiency of currently available optical probes. The probe of the present invention improves efficiency by two to three orders of magnitude, which may improve the access time of magneto-optical memory by similar orders of magnitude.

Another application for the high efficiency probe of the invention is in microlithography. Microlithography is used in the fabrication of semiconductor chips, such as dynamic random access memories (DRAMs). The manufacture of integrated circuits by microlithography involves employing a mask that is etched with the desired circuit design. Silicon wafers which are eventually diced up into chips, are coated with a light sensitive material or resist. Light is then shined through the mask onto the wafer, exposing areas of the resist. Washing the wafer with a solvent dissolves the unwanted resist and leaves a copy of the mask design on the wafer.

As circuit designs become tighter, to achieve higher storage densities, the use of visible light with conventional technology becomes troublesome, as conventional visible light technology provides insufficient resolution and insufficient optical energy. Some have experimented with shorter wavelength energy, such as X-rays, but these techniques are problematic to control. The optical probe of the present invention allows optical fabrication techniques to be used, but with much higher resolution. This is because the optical probe can produce a much smaller diameter beam of light while still providing sufficient illumination intensity.

Another particularly important application of the present high efficiency probe is in high speed DNA sequencing and diagnostics. The DNA sequencing application requires both high efficiency and high resolution. Thus, the preferred embodiment for this application is that illustrated in FIG. 6, or the equivalent, to produce supercooled conditions that yield optical opacity of the coating adjacent the light-emitting aperture. The high optical output and extremely fine resolution afforded by the probe of the invention allows the near field scanning optical microscope to optically examine the DNA molecule at a sufficient resolution to perform DNA sequencing. Due to the probe's high efficiency and high resolution, the NSOM-based sequencer will have an overall throughput roughly two orders of magnitude greater than sequencing devices available today. This is expected to reduce the sequencing cost per base pair by a factor of 1,000 and to achieve sequencing rates on the order of 100 kilobases per hour or better. The probe of the invention thus represents a significant advance over heretofore available DNA sequencing techniques, particular when one considers that at the current technologically possible sequencing rate, it will take an estimated 300 years to complete the entire human genome sequencing project. The present invention is expected to cut this time by three orders of magnitude or more.

From the foregoing, the optical probe of the present invention offers high efficiency not heretofore achieved. By fabricating the optical probe according to the principles of the invention, efficiency is improved between two to three orders of magnitude. Although the applications of this technology are many, the higher efficiency afforded by this probe makes the probe ideal for super high density magneto-optical memory devices, optical lithography and near field optical microscopy. When implemented in a supercooled mode, the fiber optic probe delivers extremely high resolution in addition to high efficiency, making the probe suitable for DNA sequencing using near field optical microscopy.

While the invention has been described in its presently preferred embodiment, it will be understood that certain modifications can be made to the basic design without departing from the spirit of the invention as set forth in the appended claims.

What is claimed is:

1. A high efficiency optical probe, comprising:
   a fiber optic cable having an inner core and an outer cladding that concentrically encapsulates the inner core, the cable having a proximal end for coupling to a light source and having a distal end which defines a light-emitting probe;
   said light-emitting probe having a tapered tip that protrudes longitudinally outwardly from said outer cladding, the tapered tip comprising a portion of said inner core that extends longitudinally beyond the outer cladding;
   said tapered tip defining a light-emitting aperture at its tapered extremity, the tip being tapered at an acute angle with respect to the longitudinal axis of the cable;
   wherein said acute angle is selected such that light propagating from the cable to the aperture traverses the tapered tip in an evanescent mode for fewer than five optical wavelengths.

2. The probe of claim 1 wherein said acute angle is on the order of about fifteen (15) degrees to thirty-five (35) degrees.

3. The probe of claim 1 wherein said acute angle is selected to achive a balance between minimizing the impedance mismatch due to reflection and minimizing the optical signal loss due to propagation in the evanescent mode, such that the optical energy transmitted through the aperture is substantially maximized.

4. The probe of claim 1 wherein said tapered tip is fabricated by etching said inner core.

5. The probe of claim 1 wherein said tapered tip is fabricated by wet chemical etching said inner core.

6. The probe of claim 1 wherein said tapered tip is fabricated by removing a portion of said outer sheath to expose said portion of said inner core.

7. The probe of claim 6 wherein said portion of said outer sheath is removed by etching.

8. The probe of claim 6 wherein said portion of said outer sheath is removed by wet chemical etching.

9. The probe of claim 1 wherein said tapered tip is provided with an optically opaque coating that is electrically conductive at optical wavelengths.

10. A high efficiency optical probe, comprising:
    a fiber optic cable having an inner core and an outer cladding that concentrically encapsulates the inner core, the cable having a distal end which defines a light transmitting probe;
    said light transmitting probe having a tapered tip that protrudes longitudinally outwardly from said outer cladding, the tapered tip comprising a portion of said inner core that extends longitudinally beyond the outer cladding;
    said tapered tip defining a light transmitting aperture at its tapered extremity, the tip being tapered at an acute angle with respect to the longitudinal axis of the cable;
    said tapered tip being provided with an optically opaque coating that is electrically conductive at optical wavelengths;
    wherein said acute angle is selected such that light propagating from the cable to the aperture traverses the tapered tip in an evanescent mode for fewer than five optical wavelengths.

11. The probe of claim 10 wherein said coating is a metalic coating.

12. The probe of claim 10 wherein said acute angle is the order of about fifteen (15) degrees to thirty-five (35) degrees.

13. The probe of claim 10 wherein said acute angle is selected to achive a balance between minimizing the impedance mismatch due to reflection and minimizing the optical signal loss due to propagation in the evanescent mode, such that the optical energy transmitted through the aperture is substantially maximized.

14. The probe of claim 10 wherein said tapered tip is fabricated by etching said inner core.

15. The probe of claim 10 wherein said tapered tip is fabricated by wet chemical etching said inner core.

16. The probe of claim 10 wherein said tapered tip is fabricated by removing a portion of said outer sheath to expose said portion of said inner core.

17. The probe of claim 16 wherein said portion of said outer sheath is removed by etching.

18. The probe of claim 16 wherein said portion of said outer sheath is removed by wet chemical etching.

19. A high efficiency optical probe, comprising:
    a fiber optic cable having a proximal end for coupling to a light source and having a distal end which defines a light-emitting probe;
    said light-emitting probe having a tapered tip that protrudes longitudinally outwardly defining a light emitting aperture at its tapered extremity;

the tip being tapered at an acute angle with respect to the longitudinal axis of the cable, the acute angle being selected to achive a balance between minimizing the impedance mismatch due to reflection and minimizing the optical signal loss due to propagation in the evanescent mode, such that the optical energy transmitted through the aperture is substantially maximized.

20. The probe of claim 19 wherein said acute angle is on the order of about fifteen (15) degrees to thirty-five (35) degrees.

21. The probe of claim 19 wherein said acute angle is selected such that light propagating from the cable to the aperture traverses the tapered tip in an evanescent mode for fewer than five optical wavelengths.

22. The probe of claim 19 wherein said tip is fabricated by etching.

23. The probe of claim 19 wherein said tip is fabricated by wet chemical etching.

24. The probe of claim 19 wherein said fiber optic cable is provided with coupling for introducing light into said cable at the end opposite said aperture.

25. A high efficiency optical probe, comprising:

fiber optic cable having a distal end which defines a light transmitting probe;

said light transmitting probe having a tapered tip that protrudes longitudinally outwardly defining a light transmitting aperture at its tapered extremity;

said tapered tip being provided-with an optically opaque coating that is electrically conductive at optical wavelengths;

the tip being tapered at an acute angle with respect to the longitudinal axis of the cable, the acute angle being selected to achive a balance between minimizing the impedance mismatch due to reflection and minimizing the optical signal loss due to propagation in the evanescent mode, such that the optical energy transmitted through the aperture is substantially maximized.

26. The probe of claim 25 wherein said tip is fabricated by etching.

27. The probe of claim 25 wherein said tip is fabricated by wet chemical etching.

28. The probe of claim 25 wherein said acute angle is on the order of about fifteen (15) degrees to thirty-five (35) degrees.

29. The probe of claim 25 wherein said acute angle is selected such that light propagating from the cable to the aperture traverses the tapered tip in an evanescent mode for fewer than five optical wavelengths.

* * * * *